(12) United States Patent
Nakada

(10) Patent No.: US 11,915,385 B2
(45) Date of Patent: Feb. 27, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yuichi Nakada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 331 days.

(21) Appl. No.: 17/368,877

(22) Filed: Jul. 7, 2021

(65) Prior Publication Data

US 2022/0020111 A1  Jan. 20, 2022

(30) Foreign Application Priority Data

Jul. 17, 2020  (JP) ................ 2020-123147

(51) Int. Cl.
*G06T 5/50* (2006.01)
*G06T 5/00* (2006.01)
*G06T 3/40* (2006.01)

(52) U.S. Cl.
CPC ............ *G06T 3/40* (2013.01); *G06T 5/003* (2013.01); *G06T 5/50* (2013.01)

(58) Field of Classification Search
CPC ..... G06T 3/00–40; G06T 3/003; G06T 3/005; G06T 3/009; G06T 3/606; G06T 3/4007; G06T 3/4053; G06T 3/4092
USPC ............. 382/100, 255, 263, 264, 274, 276
See application file for complete search history.

(56) References Cited

U.S. PATENT DOCUMENTS

| | | | |
|---|---|---|---|
| 6,832,009 B1 * | 12/2004 | Shezaf | G06T 3/403 382/300 |
| 10,304,164 B2 | 5/2019 | Nakada | |
| 10,878,536 B1 * | 12/2020 | Stimm | H04N 19/59 |
| 2005/0089247 A1 * | 4/2005 | Braun | G06T 5/004 382/298 |
| 2006/0115176 A1 * | 6/2006 | Kanamori | G06T 5/003 382/298 |
| 2008/0031538 A1 * | 2/2008 | Jiang | G06T 5/002 348/E5.064 |
| 2009/0316794 A1 * | 12/2009 | Tanaka | G06T 3/403 375/E7.076 |
| 2017/0134716 A1 * | 5/2017 | Naito | H04N 23/633 |
| 2017/0154408 A1 * | 6/2017 | Jobara | G06T 3/4038 |
| 2020/0137363 A1 | 4/2020 | Nakada | |
| 2021/0075952 A1 | 3/2021 | Nakada | |

FOREIGN PATENT DOCUMENTS

JP  2019-146010 A  8/2019

* cited by examiner

*Primary Examiner* — Sheela C Chawan
(74) *Attorney, Agent, or Firm* — Carter, DeLuca & Farrell LLP

(57) ABSTRACT

The present invention acquires a local enlargement ratio in an image transformed based on a transformation parameter and then acquires a transformed image which is a captured image transformed based on the transformation parameter. The present invention acquires a sharpening parameter for sharpening the transformed image based on the lens information, which indicates the resolution of a lens used at the time of capturing the captured image, and the enlargement ratio, and performs sharpening of the transformed image based on the sharpening parameter.

13 Claims, 14 Drawing Sheets

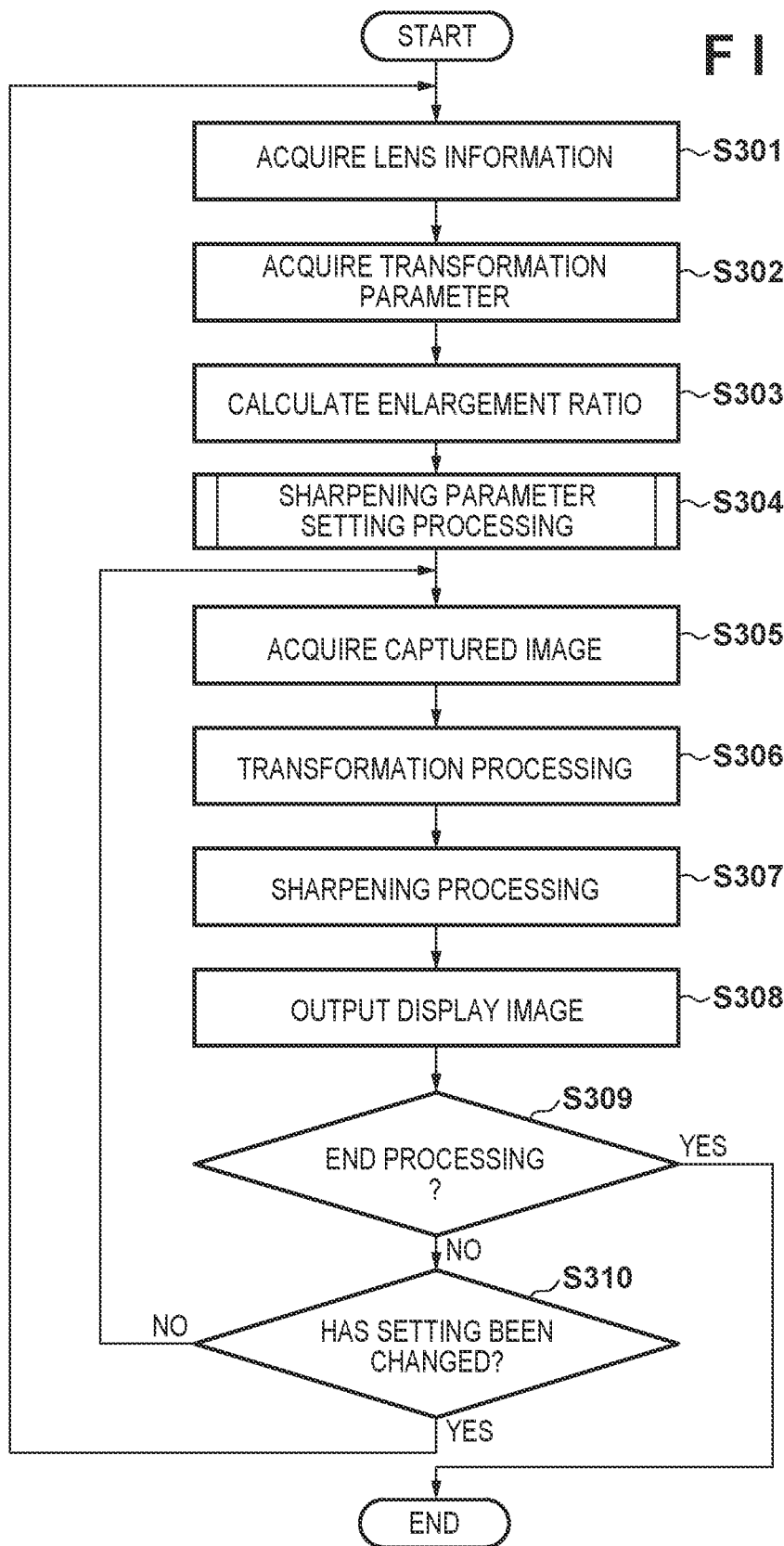

FIG. 6

| SCREEN | id | jd | ic | jc |
|---|---|---|---|---|
| LEFT SIDE SCREEN | 0 | 0 | 0 | 710.2 |
| LEFT SIDE SCREEN | 1 | 0 | 0.7 | 710.1 |
| LEFT SIDE SCREEN | 2 | 0 | 1.5 | 710.0 |
| ⋮ | ⋮ | ⋮ | ⋮ | ⋮ |
| CENTER SCREEN | 3840 | 0 | 1400.1 | 725.5 |
| CENTER SCREEN | 3841 | 0 | 1400.7 | 725.5 |
| CENTER SCREEN | 3842 | 0 | 1401.4 | 725.4 |
| ⋮ | ⋮ | ⋮ | ⋮ | ⋮ |
| RIGHT SIDE SCREEN | 7680 | 0 | 2695.5 | 725.5 |
| RIGHT SIDE SCREEN | 7681 | 0 | 2696.2 | 725.4 |
| RIGHT SIDE SCREEN | 7682 | 0 | 2697.0 | 725.3 |
| ⋮ | ⋮ | ⋮ | ⋮ | ⋮ |

FIG. 10

| IMAGE HEIGHT [mm] | σm | σs |
|---|---|---|
| 0 | 1.0 | 1.0 |
| 1 | 1.1 | 1.1 |
| 2 | 1.3 | 1.2 |
| ⋮ | ⋮ | ⋮ |

● REPRESENTATIVE POINT
THAT RETAINS LENS
INFORMATION

CAPTURED IMAGE

F I G. 12A
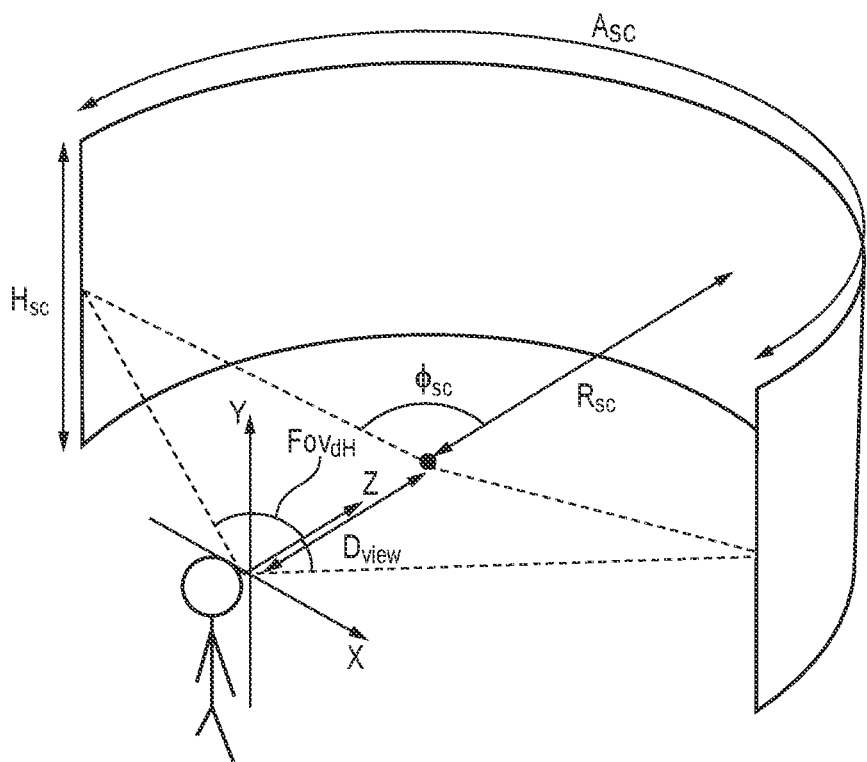
F I G. 12B

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for sharpening a transformed image.

Description of the Related Art

Conventionally, a wide field of view video image display system for providing a highly realistic experience to a viewer has been known as a type of video image display system. This wide field of view video image display system provides a highly realistic experience to a viewer by projecting a video image onto a screen of a concave surface shape that is a part of a spherical or cylindrical surface covering the field of view of the viewer, a plurality of flat screens combined to approximate a concave surface, or the like.

A technique described in, for example, Japanese Patent Laid-Open No. 2019-146010 is disclosed as a technique for generating a display image for such display screens. Japanese Patent Laid-Open No. 2019-146010 discloses a technique for generating a display image with fewer unnatural distortions by rendering a projection surface set in the virtual space based on a correspondence relationship between a captured image and the projection surface.

In order to realize a display of a highly realistic video that creates a feeling of "being there", a display image needs to have less distortions and perceived resolution of the display image needs to be uniform. However, depending on the lens used for capturing, there are cases where perceived resolution of a captured image is significantly lower in the peripheral portion compared to the central portion due to aberration and the like. Also, when generating a display image from a captured image, there are cases where the degree of degradation of perceived resolution varies depending on the region. As a result, perceived resolution changes depending on the direction from which the viewer is viewing, leading to diminished realism.

SUMMARY OF THE INVENTION

The present invention provides a technique for bringing uniformity to perceived resolution of a transformed image generated by transforming a captured image.

According to the first aspect of the present invention, there is provided an image processing apparatus comprising: a first acquisition unit configured to acquire a local enlargement ratio in an image transformed based on a transformation parameter; a second acquisition unit configured to acquire a transformed image which is a captured image transformed based on the transformation parameter; a third acquisition unit configured to acquire a sharpening parameter for sharpening the transformed image based on lens information, which indicates resolution of a lens used at a time of capturing the captured image, and the enlargement ratio; and a processing unit configured to perform sharpening of the transformed image based on the sharpening parameter.

According to the second aspect of the present invention, there is provided an image processing method performed by an image processing apparatus, the method comprising: acquiring a local enlargement ratio in an image transformed based on a transformation parameter; acquiring a transformed image which is a captured image transformed based on the transformation parameter; acquiring a sharpening parameter for sharpening the transformed image based on lens information, which indicates resolution of a lens used at a time of capturing the captured image, and the enlargement ratio; and performing sharpening of the transformed image based on the sharpening parameter.

According to the third aspect of the present invention, there is provided a non-transitory computer-readable storage medium for storing a computer program for causing a computer to function as: a first acquisition unit configured to acquire a local enlargement ratio in an image transformed based on a transformation parameter; a second acquisition unit configured to acquire a transformed image which is a captured image transformed based on the transformation parameter; a third acquisition unit configured to acquire a sharpening parameter for sharpening the transformed image based on lens information, which indicates resolution of a lens used at a time of capturing the captured image, and the enlargement ratio; and a processing unit configured to perform sharpening of the transformed image based on the sharpening parameter.

Further features of the present invention will become apparent from the following description of exemplary embodiments with reference to the attached drawings.

BRIEF DESCRIPTION OF THE DRAWINGS

FIG. 3 is a flowchart of processing that the image processing apparatus performs.

FIG. 6 is a view illustrating an example of a transformation parameter.

FIG. 10 is a view illustrating an example of lens information.

FIG. 12A is a view illustrating a curved screen.

FIG. 12B is a view illustrating an example of a display image.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

Figure 1:
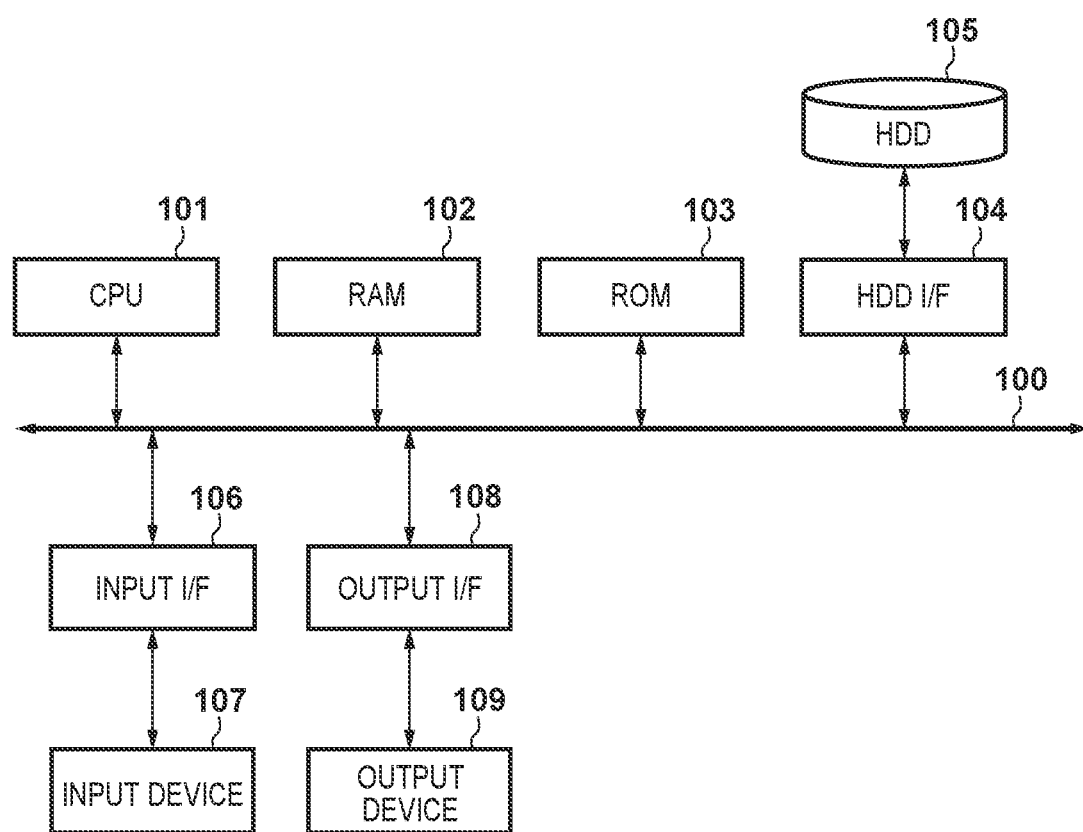
FIG. 1 is a block diagram illustrating an example of a hardware configuration of an image processing apparatus.

First, an example of a hardware configuration of an image processing apparatus according to the present embodiment will be described with reference to a block diagram of FIG. 1. Note that the configuration illustrated in FIG. 1 is merely an example of a hardware configuration that can be applied to the image processing apparatus according to the present embodiment and can be changed as necessary.

A CPU 101 executes various processes using computer programs and data stored in a RAM 102 and a ROM 103. By this, the CPU 101 performs control of operation of the entire image processing apparatus and executes or controls each process described to be performed by the image processing apparatus.

The RAM 102 has an area for storing computer programs and data loaded from the ROM 103 or an HDD 105 and an area for storing data inputted with an input device 107. The RAM 102 also includes a work area used for when the CPU 101 executes various processes. In this manner, the RAM 102 can appropriately provide various areas.

In the ROM 103, setting data of the image processing apparatus, computer programs and data pertaining to activation of the image processing apparatus, computer programs and data pertaining to basic operations of the image processing apparatus, and the like are stored.

An HDD I/F 104 is an interface such as a serial ATA (SATA) or the like and is an interface for connecting the HDD 105 to a bus 100. In the HDD 105, an OS (operating system), computer programs and data for causing the CPU 101 to execute or control each process described to be performed by the image processing apparatus, and the like are stored. Computer programs and data stored in the HDD 105 are loaded to the RAM 102 as necessary in accordance with control by the CPU 101 and is a target of processing by the CPU 101.

An input I/F 106 is a serial bus interface such as a USB, IEEE 1394, or the like and is an interface for connecting the input device 107 to the bus 100.

The input device 107 includes apparatuses for inputting instructions and data to the image processing apparatus such as user interfaces (e.g., a keyboard, a mouse, and a touch panel screen) and an image capturing apparatus capable of capturing moving images and still images of a real space.

An output I/F 108 is a video output interface such as DVI, HDMI®, or the like and is an interface for connecting an output device 109 to the bus 100. The output device 109 is an apparatus, such as a liquid crystal display and a projector, capable of providing an image across a wide range. In the present embodiment, the output device 109 will be described as an apparatus for providing to a viewer one image across a plurality of screens by projecting/displaying images that correspond to each of the plurality of screens. The CPU 101, the RAM 102, the ROM 103, the HDD I/F 104, the input I/F 106, and the output I/F 108 are all connected to the bus 100.

Figure 4A:
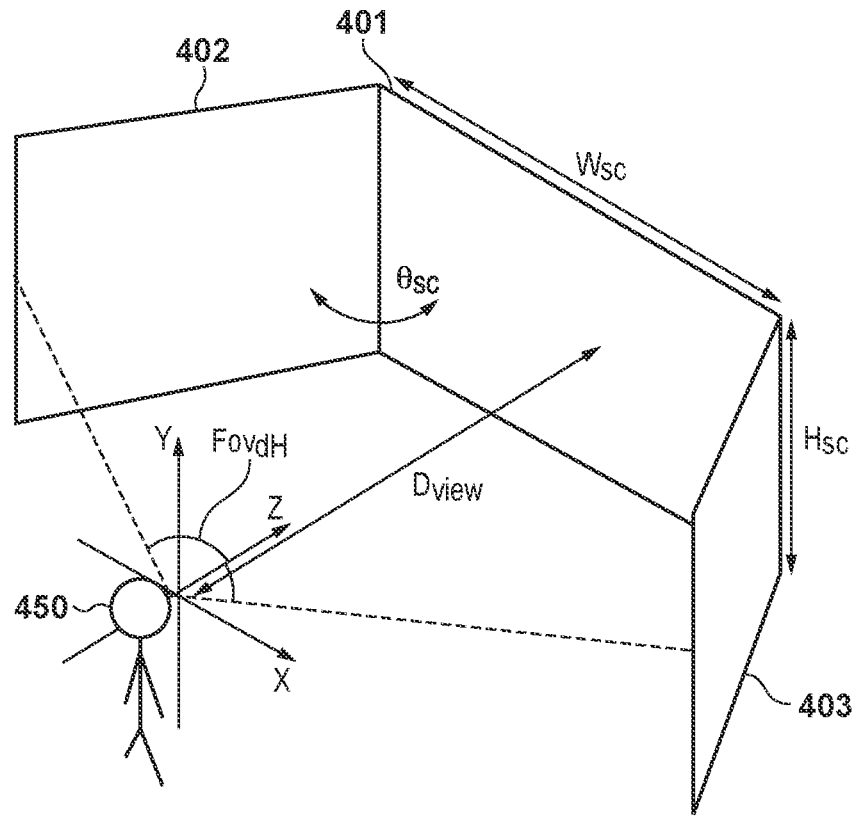
FIG. 4A is a view illustrating an example of screens.

A plurality of screens on which the output device 109 projects an image will be described using FIG. 4A. As illustrated in FIG. 4A, the plurality of screens on which the output device 109 projects an image includes three screens, a center screen 401, a left side screen 402, and a right side screen 403, and these screens are arranged so as to cover the field of view of a viewer 450.

The center screen 401, the left side screen 402, and the right side screen 403 respectively have a width of Wsc and a height of Hsc. Also, an opening angle between the center screen 401 and the left side screen 402 is θsc. Note that an opening angle between the center screen 401 and the right side screen 403 is the same at θsc. It is assumed that the viewer 450 views these screens from a position that is a distance Dview from the center screen 401, and a viewing angle (display angle) of the entire screen at the viewer position is FovdH.

In such a case, the output device 109 includes a projection apparatus A for projecting an image on the left side screen 402, a projection apparatus B for projecting an image on the center screen 401, and a projection apparatus C for projecting an image on the right side screen 403. The image processing apparatus according to the present embodiment generates a display image to be projected by the output device 109 and then outputs the generated display image to the output device 109. The output device 109 projects a partial image which corresponds to the left side screen 402 in the display image on the left side screen 402 using the projection apparatus A. The output device 109 projects a partial image which corresponds to the center screen 401 in the display image on the center screen 401 using the projection apparatus B. The output device 109 projects a partial image which corresponds to the right side screen 403 in the display image on the right side screen 403 using the projection apparatus C.

Figure 4B:
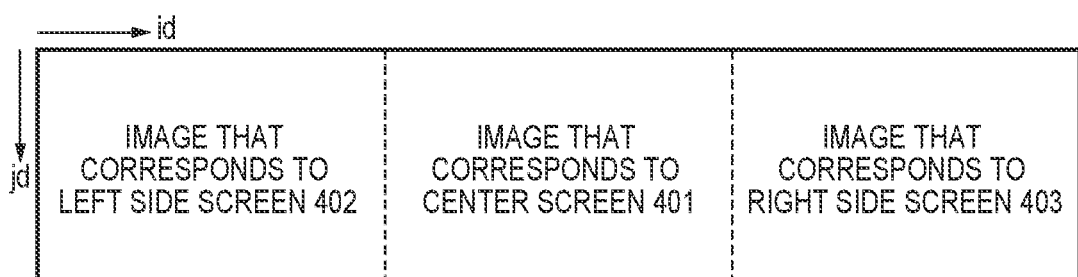
FIG. 4B is a view illustrating an example of a configuration of a display image.

An example of a configuration of the display image is illustrated in FIG. 4B. As illustrated in FIG. 4B, the display image is an image that corresponds to the left side screen 402, an image that corresponds to the center screen 401, and an image that corresponds to the right side screen 403 lined up in that order from the left. In other words, the display image is images to be projected onto the screens lined up in the order of the screens.

Figure 2:
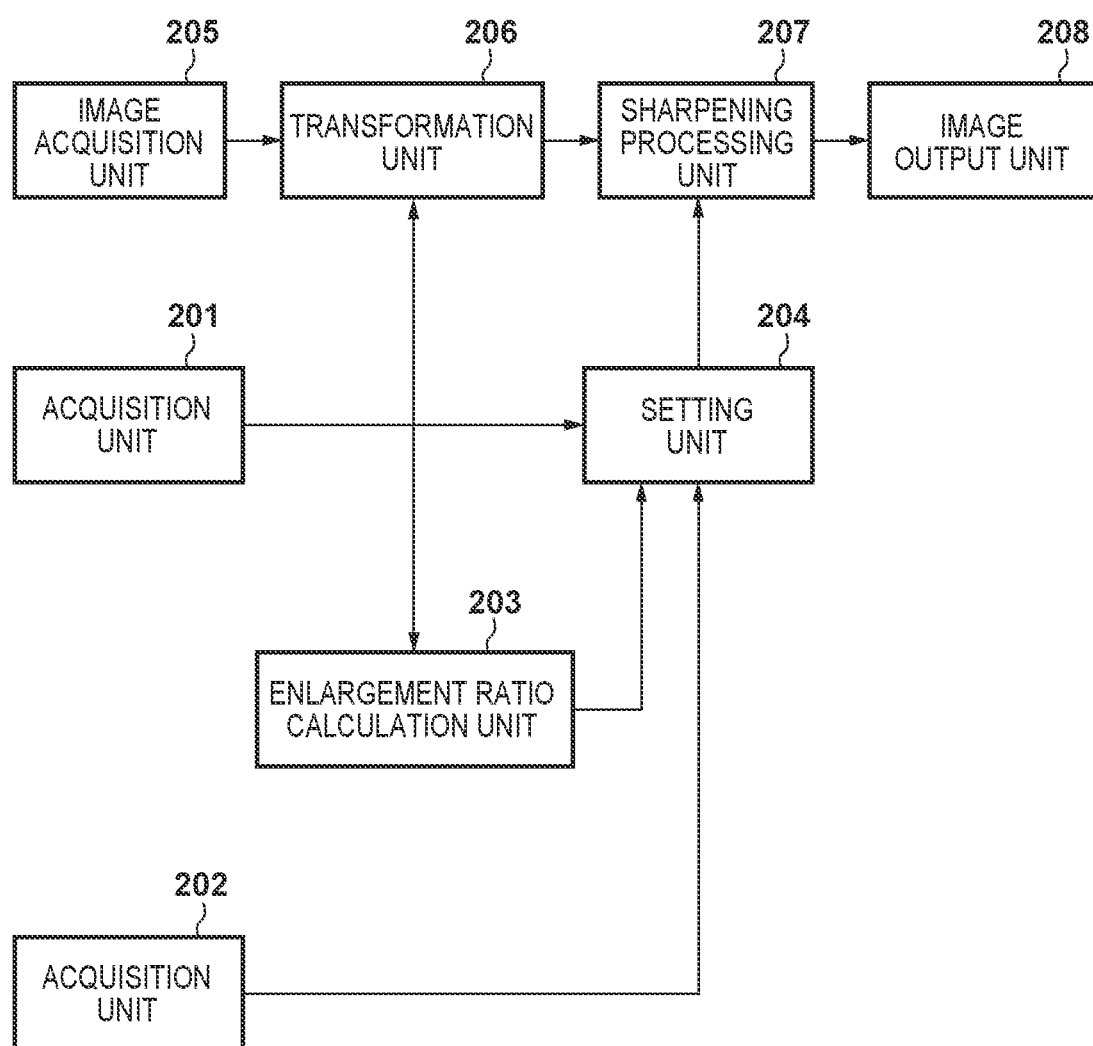
FIG. 2 is a block diagram illustrating an example of a functional configuration of the image processing apparatus.

An example of a functional configuration of the image processing apparatus according to the present embodiment is illustrated in FIG. 2. Processing that the image processing apparatus, which has the example of the functional configuration illustrated in FIG. 2, performs in order to generate a display image and then output it to the output device 109 will be described in accordance with a flowchart of FIG. 3. In the processing that follows the flowchart of FIG. 3, a local enlargement ratio in an image transformed based on a transformation parameter is acquired and a transformed image, which is a captured image transformed based on the transformation parameter, is acquired. Then, a sharpening parameter for sharpening the transformed image is acquired based on the lens information, which indicates the resolution of a lens used at the time of capturing the captured image, and the enlargement ratio, and sharpening of the transformed image is performed based on the sharpening parameter. This sharpened, transformed image is transmitted to the output device 109 as a display image and then projected onto the screens.

In the following, there are cases where a functional unit illustrated in FIG. 2 is described as a performer of the processing, however, in practice, a function of the functional unit is realized by the CPU 101 executing a computer program for causing the CPU 101 to execute or control the function of the functional unit.

Figure 5:
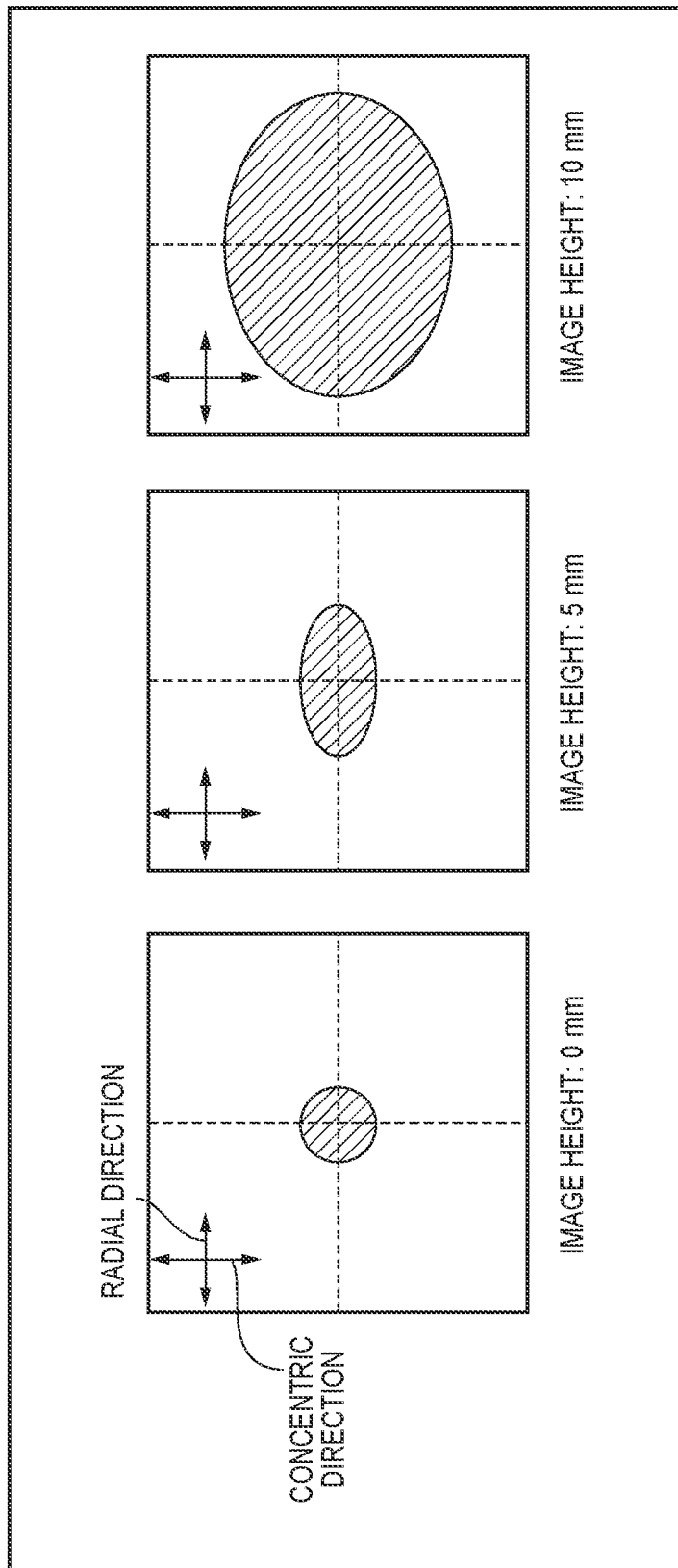
FIG. 5 is a view illustrating examples of lens information.

In step S301, an acquisition unit 202 acquires lens information which indicates the resolution of a lens used at the time of capturing the captured image. Examples of the lens information acquired in step S301 are illustrated in FIG. 5. The lens information illustrated in FIG. 5 is two-dimensional smoothing filters that indicate lens resolution that accords with the image height. In FIG. 5, smoothing filters that correspond to each of the image heights, 0 mm, 5 mm, and 10 mm, are illustrated as the lens information.

Each smoothing filter is set based on the resolution in a radial direction and a concentric direction and is a filter that increases in smoothing effect as resolution decreases. Here, the horizontal direction of the smoothing filters corresponds to lens resolution in the radial direction, and the vertical direction of the smoothing filters corresponds to lens resolution in the concentric direction. In FIG. 5, smoothing filters for a case where resolution decreases as the image height increases are illustrated, and the smoothing filter becomes larger (i.e., the smoothing filter increases in smoothing effect) as the image height increases.

Note that in step S301, configuration may also be taken so as to acquire not only the smoothing filters that correspond to each of the image heights, 0 mm, 5 mm, and 10 mm but also smoothing filters that correspond to a greater variety of image heights. In other words, in step S301, lens information that corresponds to one or more image heights is acquired.

Also, lens information corresponds to shooting parameters (shooting parameters such as a type and focal length of the lens, an aperture value, and a subject distance) at the time of capturing a captured image. The shooting parameters may be acquired based on metadata added on to a captured image, or an input that a user made by operating the input device 107 may be acquired.

Note that the acquisition unit 202 may acquire lens information already stored in the HDD 105, lens information from an external apparatus, or lens information obtained based on various kinds of information that the user inputted by operating the input device 107. In other words, the method of acquiring lens information by the acquisition unit 202 is not limited to a specific acquisition method.

In step S302, an acquisition unit 201 acquires a transformation parameter which is a parameter for transforming a captured image. An example of the transformation parameter acquired in step S302 is illustrated in FIG. 6.

The transformation parameter of FIG. 6 is a table in which a pixel position (id, jd) in the transformed image and a pixel position (ic, jc), which corresponds to the pixel position (id, jd), in the captured image are registered in association. Also, in the table of FIG. 6, whether the pixel position (id, jd) in the transformed image is projected on the left side screen 402, the center screen 401 or the right side screen 403 is registered under "screen".

The table of FIG. 6 can be obtained based on a type and focal length of the lens at the time of capturing the captured image, shape information of the screen with respect to the viewer position, and the like. Accordingly, for example, the transformation parameter at which an image is not distorted when viewed from the viewer position is calculated in advance based on a projection method and focal length of the lens and a screen shape and is registered in the HDD 105 as a table.

Note that the acquisition unit 201 may acquire a transformation parameter already registered in the HDD 105 or a transformation parameter from an external apparatus, and the acquisition method thereof is not limited to a specific acquisition method.

In step S303, an enlargement ratio calculation unit 203 acquires a local enlargement ratio of a transformed image for a transformation from a captured image to the transformed image based on the transformation parameter acquired in step S302.

The enlargement ratio calculation unit 203 obtains an enlargement ratio in the horizontal direction (horizontal enlargement ratio) Rx(i, j) and an enlargement ratio in the vertical direction (vertical enlargement ratio) Ry(i, j) of a pixel position (i, j) in the transformed image in accordance with the following Equation (1).

$$R_x(i,j) = \frac{2}{f_x(i+1,j) - f_x(i-1,j)} \quad \text{Equation (1)}$$
$$R_y(i,j) = \frac{2}{f_y(i,j+1) - f_y(i,j-1)}$$

$$f_x(i_d, j_d) = i_c \quad \text{Equation (2)}$$
$$f_y(i_d, j_d) = j_c$$

Here, fx is a function that returns the pixel position in the horizontal direction of the pixel position in the captured image which corresponds to the pixel position in the transformed image. More specifically, as indicated in Equation (2), fx(id, jd) is a function that returns ic which is the pixel position in the horizontal direction of the pixel position (ic, jc) in the captured image which corresponds to the pixel position (id, jd) in the transformed image. In other words, fx(id, jd) is a function that returns ic of the pixel position (ic, jc) which corresponds to the pixel position (id, jd) in the table of FIG. 6. Meanwhile, fy is a function that returns the pixel position in the vertical direction of the pixel position in the captured image which corresponds to the pixel position in the transformed image. More specifically, as indicated in Equation (2), fy(id, jd) is a function that returns jc, which is the pixel position in the vertical direction of the pixel position (ic, jc) in the captured image which corresponds to the pixel position (id, jd) in the transformed image. In other words, fy(id, jd) is a function that returns jc of the pixel position (ic, jc) which corresponds to the pixel position (id, jd) in the table of FIG. 6. Accordingly, the enlargement ratio calculation unit 203, by the processing in step S303, acquires a horizontal enlargement ratio Rx and a vertical enlargement ratio Ry which correspond to each pixel position in the transformed image.

In step S304, a setting unit 204 obtains a sharpening parameter for sharpening a transformed image based on the lens information acquired in step S301 and the enlargement ratio obtained in step S303 and then sets the obtained sharpening parameter.

In the present embodiment, it is assumed that sharpening that employs unsharp masking is performed, and in step S304, a smoothing filter to be used as a sharpening parameter in unsharp masking is set for each pixel of the transformed image. At that time, a smoothing filter of a higher smoothing effect is set for pixels of lower lens resolution or pixels of a higher enlargement ratio. Details of the processing in step S304 will be described later.

In step S305, an image acquisition unit 205 acquires a captured image. For example, the image acquisition unit 205 may acquire via the HDD I/F 104 one predetermined captured image (e.g., a captured image that the user designated by operating the input device 107) from the captured images already stored in the HDD 105. Also, for example, the image acquisition unit 205 may acquire via the input I/F 106 a captured image that an image capturing apparatus as the input device 107 captured. Also, for example, the image acquisition unit 205 may acquire a captured image transmitted from an external apparatus. As described above, the method of acquiring the captured image is not limited to a specific acquisition method.

In step S306, a transformation unit 206 generates a transformed image which is the captured image acquired in step S305 transformed based on the transformation parameter acquired in step S302. The transformation unit 206 identifies the pixel position (ic, jc) in the captured image that corresponds to the pixel position (id, jd) in the transformed image by referencing the table of FIG. 6. Then, the transformation unit 206 obtains a pixel value of a pixel at the pixel position (id, jd) in the transformed image by interpolation of pixel values of neighboring pixels of the identified pixel position (ic, jc) in the captured image. For interpolation, nearest-neighbor interpolation, bilinear interpolation, bicubic interpolation, and the like may be used. By such processing, a pixel value of each pixel in the transformed image which is a transformed, captured image is decided.

In step S307, a sharpening processing unit 207 performs sharpening processing on the transformed image generated in step S306 using the sharpening parameter set in step S304. In the present embodiment, sharpening of the transformed image is performed by employing unsharp masking which uses a smoothing filter that corresponds to each pixel in the transformed image. The sharpening processing unit 207 sharpens the transformed image based on the following Equation (3).

$$I'(i,j)=I(i,j)+\alpha \cdot I(i,j)*(\delta-LPF(i,j)) \quad \text{Equation(3)}$$

Here, I'(i, j) indicates a pixel value at the pixel position (i, j) in the display image obtained by performing sharpening on the transformed image, and I(i, j) indicates a pixel value at the pixel position (i, j) in the transformed image, $\alpha$ is a parameter for adjusting sharpening intensity, and $\delta$ is a two-dimensional filter that is the same size as the smoothing filter and is a two-dimensional filter that sets a value of an element at the central position to 1 and values of elements other than that to 0. LPF(i, j) is a smoothing filter that corresponds to the pixel position (i, j) in the transformed image. $\alpha \cdot I(i, j)*(\delta-LPF(i, j))$ represents an operation for obtaining a pixel value by applying a filter, $(\delta-LPF(i, j))$, to $\alpha \cdot I(i, j)$.

The sharpness processing that employs unsharp masking increases in the sharpening effect as the smoothing filter used increases in the smoothing effect. In the present embodiment, a smoothing filter of a higher smoothing effect is set for pixels of lower lens resolution or pixels of a higher enlargement ratio; accordingly, the sharpening effect is increased.

In step S308, an image output unit 208 outputs the transformed image sharpened in the sharpening processing in step S307 to the output device 109 via the output I/F 108 as a display image. By this, the output device 109 projects on the left side screen 402 the image in the image region that corresponds to the left side screen 402 in the display image, projects on the center screen 401 the image in the image region that corresponds to the center screen 401 in the display image, and projects on the right side screen 403 the image in the image region that corresponds to the right side screen 403 in the display image. Note that the output destination of the display image by the image output unit 208 is not limited to the output device 109 and may be, for example, the HDD 105 or an external apparatus.

In step S309, the CPU 101 determines whether or not a condition to end the processing has been met. As a result of this determination, in a case where the condition to end the processing has been met, the processing that follows the flowchart of FIG. 3 is ended, and in a case where the condition to end the processing has not been met, the processing advances to step S310.

There are various conditions to end the processing, and the end condition is not limited to a specific one. For example, "the time (measured by a timer of the CPU 101) elapsed from when the processing that follows the flowchart of FIG. 3 was started has exceeded a certain duration" may be set as the condition to end the processing. Also, for example, "the user inputted an instruction to end the processing by operating the input device 107" may be set as the condition to end the processing.

In step S310, the CPU 101 determines whether or not the setting has been changed. For example, in a case where the user has changed the above lens information, the above transformation parameter, or the like by operating the input device 107, it is determined that "the setting has been changed". As a result of this determination, in a case where the setting has been changed, the processing advances to step S301, and in a case where the setting has not been changed, the processing advances to step S305.

Figure 7:
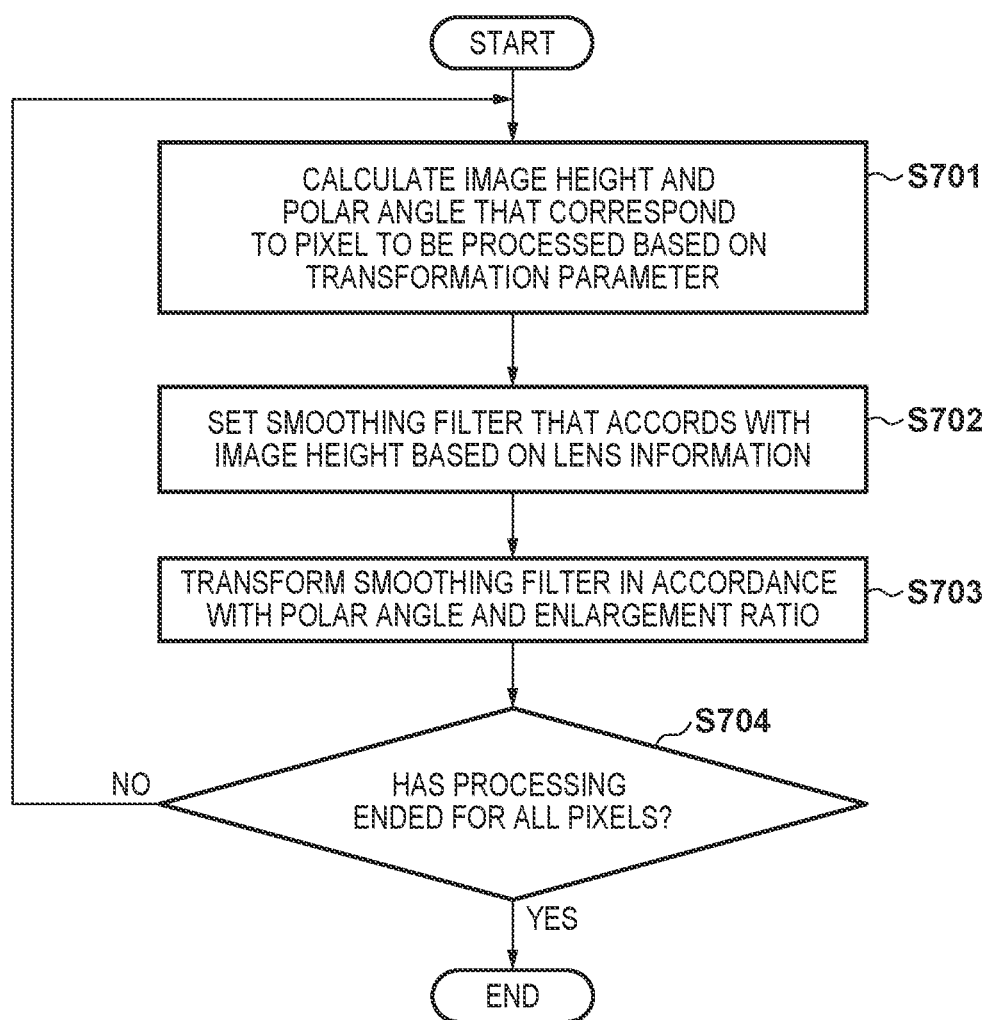
FIG. 7 is a flowchart illustrating details of the processing in step S304.

Next, the details of the processing in the above step S304 will be described in accordance with the flowchart of FIG. 7. In the present embodiment, first, an image height and a polar angle that correspond to the pixel to be processed in the transformed image are calculated based on the transformation parameter. Then, a smoothing filter that corresponds to the image height of the pixel to be processed is acquired based on the lens information, the smoothing filter is transformed based on the polar angle and the enlargement ratio, and the smoothing filter on which transformation has been executed is set as the smoothing filter to be applied to the pixel to be processed.

In step S701, the setting unit 204 selects as the pixel to be processed a pixel that has not yet been selected in the transformed image and obtains the image height and the polar angle that correspond to the selected pixel to be processed based on the transformation parameter.

Figure 8:
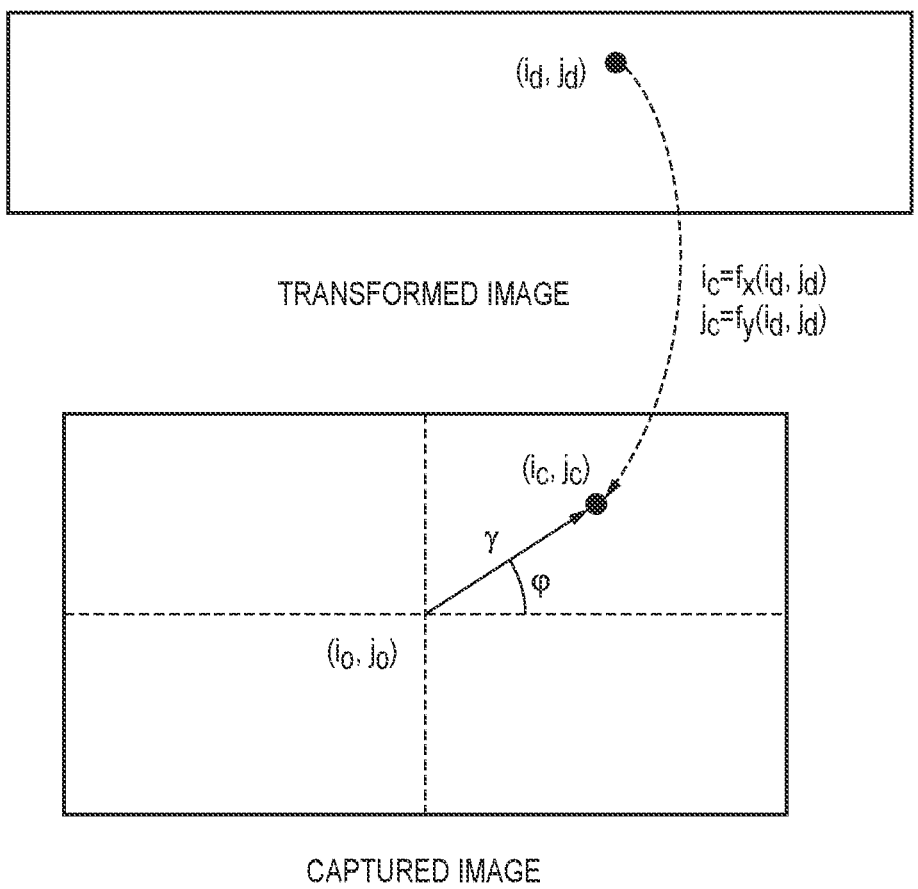
FIG. 8 is a view describing the processing in step S701.

First, the setting unit 204 refers to the transformation parameter (the table of FIG. 6) and, as illustrated in FIG. 8, identifies the pixel position (ic, jc) in the captured image that corresponds to the pixel position (id, jd) of the pixel to be processed in the transformed image. Then, the setting unit 204, as illustrated in FIG. 8, sets the center pixel position of the captured image to (io, jo) and obtains the distance between the pixel position (ic, jc) in the captured image and the center pixel position (io, jo) of the captured image as an image height r that corresponds to the pixel to be processed. Also, the setting unit 204, as illustrated in FIG. 8, obtains, as a polar angle $\varphi$, the angle that the vector directed toward the pixel position (ic, jc) in the captured image from the pixel position (io, jo) in the captured image forms with the horizontal direction of the captured image.

In step S702, the setting unit 204 acquires a smoothing filter that corresponds to the image height r obtained in step S701 from the smoothing filter acquired for each image height in step S301.

Figure 9:
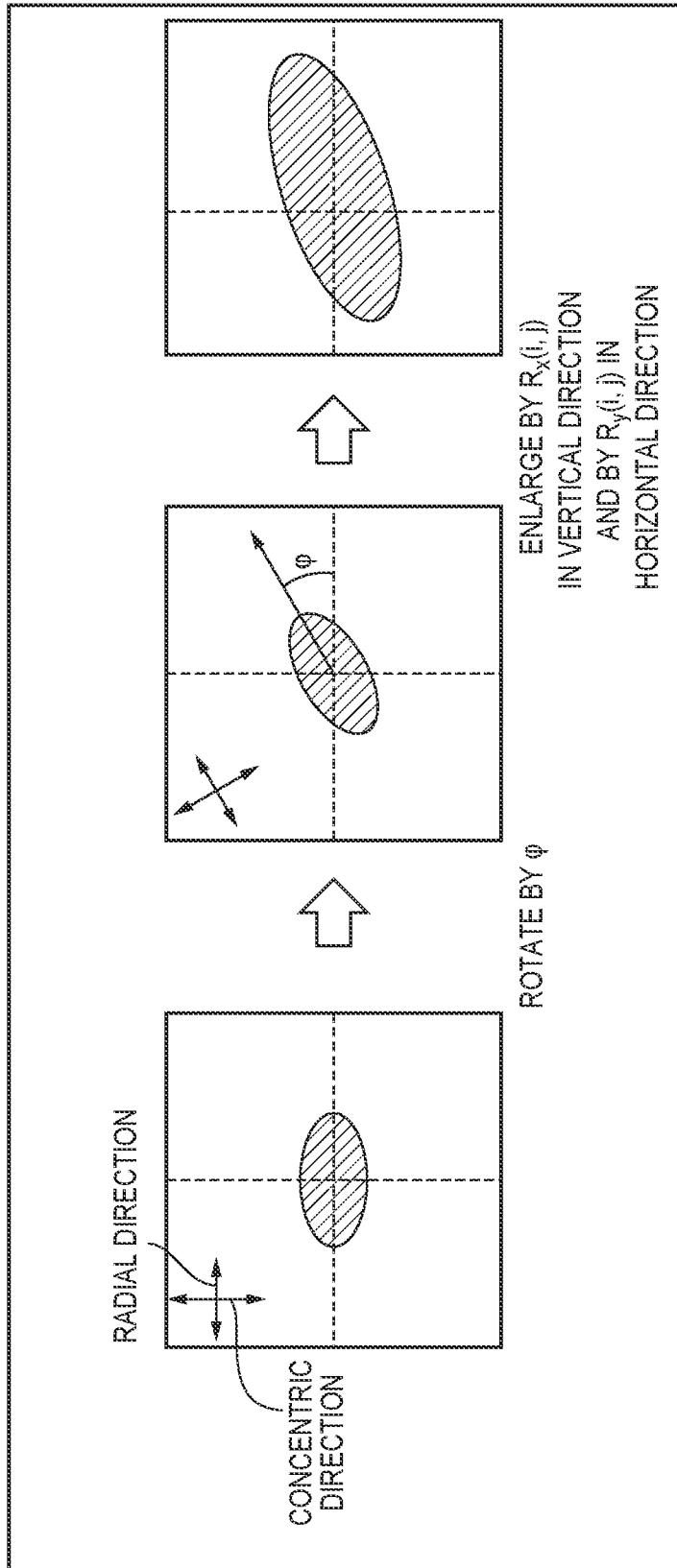
FIG. 9 is a view describing the processing in step S703.

In step S703, the setting unit 204 generates as a smoothing filter to be applied to the pixel to be processed a transformed smoothing filter which is the smoothing filter acquired in step S702 (hereinafter referred to as original smoothing filter) transformed based on the polar angle $\varphi$ obtained in step S701 and the enlargement ratios Rx and Ry of the pixel to be processed. The processing in this step will be described using FIG. 9.

First, the setting unit 204 generates a rotated smoothing filter (the drawing in the center in FIG. 9), which is the original smoothing filter (the drawing on the left in FIG. 9) rotated by the polar angle φ. Then, the setting unit 204 generates a transformed smoothing filter (the drawing on the right in FIG. 9), which is the rotated smoothing filter enlarged by the horizontal enlargement ratio Rx in the horizontal direction and the vertical enlargement ratio Ry in the vertical direction.

More specifically, the setting unit 204 obtains a position (x, y) in the original smoothing filter that corresponds to a position (x', y') in the transformed smoothing filter by calculating the following Equation (4) using the position (x', y') in the transformed smoothing filter, the polar angle φ, and the enlargement ratios Rx and Ry.

$$x = \frac{\cos(-\varphi)}{R_x}x' - \frac{\sin(-\varphi)}{R_y}y'$$
$$y = \frac{\sin(-\varphi)}{R_x}x' - \frac{\cos(-\varphi)}{R_y}y'$$

Equation (4)

Then, the setting unit 204 obtains by interpolation processing a filter coefficient at the position (x', y') in the transformed smoothing filter from a filter coefficient at a neighboring position of the position (x, y) in the original smoothing filter.

Regarding the smoothing filter according to the present embodiment, the horizontal direction corresponds to lens resolution in the radial direction and the vertical direction corresponds to lens resolution in the concentric direction. Accordingly, rotating the smoothing filter in accordance with the polar angle φ as described above makes it possible to cause the radial direction/concentric direction that correspond to the pixel to be processed and the radial direction/concentric direction of the smoothing filter to coincide. This makes it possible to convert the two-dimensional smoothing filter that indicates lens resolution that accords with the image height to a two-dimensional smoothing filter that indicates lens resolution that accords with the pixel to be processed. Also, by enlarging the smoothing filter in accordance with the enlargement ratios Rx and Ry, the smoothing filter becomes larger as the pixel to be processed increases in enlargement ratio, and the smoothing effect increases. The above processing makes it possible to set the smoothing filter to have a higher smoothing effect for pixels of lower lens resolution or pixels of higher enlargement by transformation processing.

In step S704, the setting unit 204 determines whether or not all the pixels in the transformed image have been selected as the pixels to be processed. As a result of this determination, in a case where all the pixels in the transformed image have been selected as the pixels to be processed, the processing advances to step S305. Meanwhile, in a case where there remain pixels that have not yet been selected as the pixel to be processed in the transformed image, the processing advances to step S701.

As described above, by virtue of the present embodiment, it is possible to obtain a display image by setting a sharpening parameter in accordance with the lens information at the time of capturing and the local enlargement ratio in transformation processing and then by sharpening the transformed image generated by transforming the captured image using the sharpening parameter. As a result, it is possible to bring uniformity to perceived resolution of the display image.

<Variation>

In the first embodiment, the table as illustrated in FIG. 6 was acquired as the transformation parameter in step S302; however, the transformation parameter is not limited to the table as illustrated in FIG. 6. For example, configuration may be taken so as to acquire as a conversion parameter a parameter that complies with a conversion formula for transforming the captured image. In such a case, the acquisition unit 201 obtains the pixel position (ic, jc) in the captured image that corresponds to each pixel position (id, jd) in the transformed image. For example, configuration may be taken so as to use the conversion formula for displaying the captured image captured at a designated focal length in the display environment illustrated in FIG. 4 such that the image is not distorted, acquire the focal length at the time of capturing as a conversion parameter, and then calculate the correspondence of the pixel. Alternatively, configuration may be taken so as to calculate the correspondence of the pixel based on an equation for geometric transformation such as projective transformation and a corresponding parameter such as a projective transformation parameter.

Figure 10:
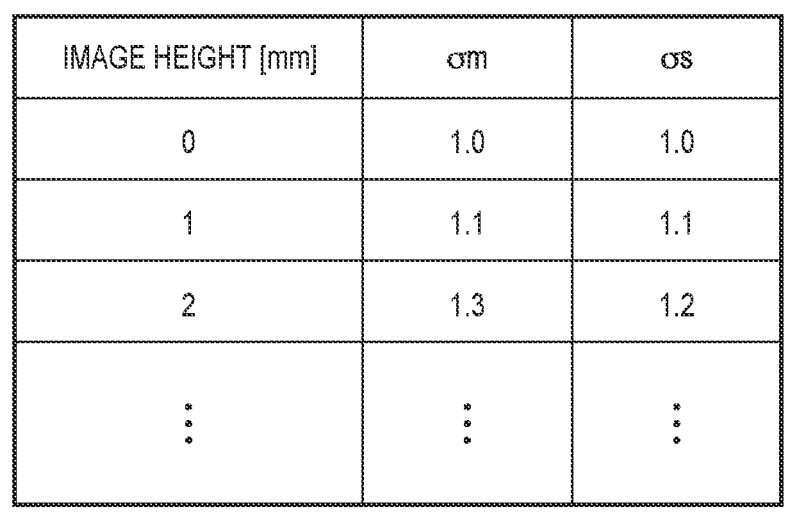

Also, in the first embodiment, a two-dimensional smoothing filter that indicates lens resolution that accords with the image height is acquired as the lens information in step S301; however, the format of lens information is not limited to this. For example, configuration may be taken so as to acquire as lens information parameters that indicate lens resolution in the radial direction and the concentric direction that accord with the image height and, based on each parameter, generate a two-dimensional smoothing filter that accords with the image height. More specifically, it is assumed that lens resolution in the radial direction and the concentric direction is expressed in a one-dimensional Gaussian filter whose parameter is a standard deviation, and then a standard deviation am that corresponds to resolution in the radial direction and a standard deviation as that corresponds to resolution in the concentric direction are acquired. An example of lens information in such a case is illustrated in FIG. 10. The lens information in such a case is managed in a set of the standard deviation am and the standard deviation as for each image height. In order to acquire a two-dimensional smoothing filter that indicates lens resolution from these, first, a one-dimensional Gaussian filter for the horizontal direction is generated based on the standard deviation am that corresponds to the radial direction and a one-dimensional Gaussian filter for the vertical direction is generated based on the standard deviation as that corresponds to the concentric direction. Then, convolving the two one-dimensional Gaussian filters makes it possible to generate a two-dimensional smoothing filter. Note that a suitable function other than the one-dimensional Gaussian filter may be used.

Also, the two-dimensional smoothing filter that represents these lens resolutions may be acquired by interpolation processing. For example, a smoothing filter that corresponds to a medium image height (e.g., between 5 mm and 10 mm) may be acquired by interpolation processing from the smoothing filters that correspond to three image heights as illustrated in FIG. 5. Alternatively, in a case of acquiring as the lens information a parameter that corresponds to lens resolution as illustrated in FIG. 10, a parameter that corresponds to an image height that is not included in the lens information may be acquired by interpolation from a parameter that corresponds to preceding and succeeding image heights. In this case, a smoothing filter that corresponds to the interpolated image height is acquired based on the parameter acquired by interpolation processing.

Figure 11:
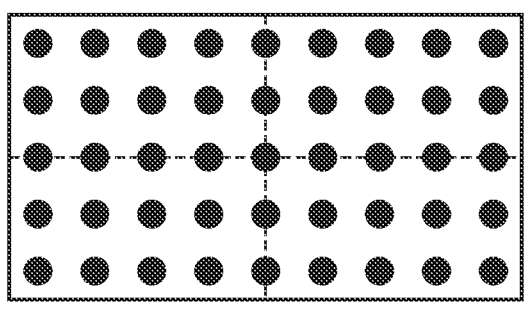
FIG. 11 is a view describing representative points.

Furthermore, a two-dimensional smoothing filter that indicates lens resolution that corresponds to a plurality of representative points in the captured image may be acquired as lens information. For example, as illustrated in FIG. 11, a smoothing filter that corresponds to the representative points arranged evenly spaced apart in the captured image is acquired. In this case, in step S701, the setting unit 204 selects the pixel that has not yet been selected in the transformed image as the pixel to be processed and acquires the image height r and the polar angle φ of the representative point that is most similar to the pixel position in the captured image that corresponds to the pixel position of the pixel to be processed in the transformed image. Then, in step S702, the setting unit 204 acquires a smoothing filter that corresponds to the image height r obtained in step S701 from the smoothing filter acquired for each image height in step S301. In step S703, rotation processing that accords with the polar angle φ is performed and then the smoothing filter is enlarged in accordance with the local enlargement ratio. The above processing makes it possible to set a sharpening parameter.

Alternatively, in step S301, a two-dimensional smoothing filter that corresponds to each of the lens resolutions that accords with the image height and polar angle is acquired as lens information. Then, in step S702, a smoothing filter may be selected in accordance with the image height and polar angle of the representative point that is most similar to the pixel position in the captured image. In such a case, in step S703, rotation processing that accords with the polar angle φ is not performed and the smoothing filter is enlarged in accordance with the local enlargement ratio. Alternatively, the two-dimensional smoothing filter that represents lens resolution that accords with the image height may be rotated in accordance with the polar angle and then set as the smoothing filter. The above processing makes it possible to set a sharpening parameter.

Also, in the first embodiment, a smoothing filter to be used in unsharp masking is set as the sharpening parameter for each pixel in step S304; however, a smoothing filter may be set for each region. In this case, configuration may be taken so as to select a representative pixel from a region and then set the smoothing filter that corresponds to the representative pixel as the sharpening parameter that corresponds to the region. The representative pixel may be, for example, a pixel at the center of the region.

Also, in the first embodiment, a smoothing filter to be used in unsharp masking is set as the sharpening parameter; however, the format of the sharpening parameter is not limited to this. For example, the sharpening processing unit 207 may obtain a filter F1 (i, j) as a sharpening parameter in accordance with the following Equation (5).

$$F_1(i,j)=\delta-LPF(i,j) \quad \text{Equation (5)}$$

In such a case, the sharpening processing unit 207 sharpens the transformed image based on the following Equation (6).

$$I'(i,j)=I(i,j)+\alpha \cdot I(i,j)*F_1(i,j) \quad \text{Equation (6)}$$

Alternatively, the sharpening processing unit 207 may obtain a filter F2 (i, j) as a sharpening parameter in accordance with the following Equation (7).

$$F_2(i,j)=(1+\alpha)\delta-\alpha LPF(i,j) \quad \text{Equation (7)}$$

In such a case, the sharpening processing unit 207 sharpens the transformed image based on the following Equation (8).

$$I'(i,j)=I(i,j)*F_2(i,j) \quad \text{Equation (8)}$$

Also, in the first embodiment, the screen onto which the output device 109 projects an image was assumed to be of a flat surface; however, the shape of the screen is not limited to a flat surface may be a curved surface or a spherical surface. FIG. 12A illustrates an example of a curved screen, and FIG. 12B illustrates an example of a display image to be inputted into the output device 109. In a case of a curved screen, the screen is configured by a single screen.

Also, the output device 109 may be a plurality of flat monitors or a curved or spherical monitor. In this case, the output device 109 displays a display image on a display surface such as those illustrated in FIG. 4A and FIG. 12A.

Also, in the first embodiment, the image processing apparatus was described to include the output device 109; however, the output device 109 may be an external apparatus of the image processing apparatus. The communication between the output device 109 and the image processing apparatus may be performed via wireless communication or wired communication. This communication makes it possible to transmit the display image generated in the image processing apparatus to the output device 109.

Second Embodiment

In the present embodiment, differences from the first embodiment will be described, and it is assumed that the present embodiment is the same as the first embodiment unless specifically mentioned in the following. In the present embodiment, the obtained sharpening parameter is registered in the HDD 105 in association with the corresponding lens information and transformation parameter. After the registration, in a case of inputting a display image to the output device 109, a sharpening parameter that corresponds to the reacquired lens information and transformation parameter are acquired from the HDD 105 and the display image is generated based on the acquired sharpening parameter and then inputted to the output device 109.

Figure 13:
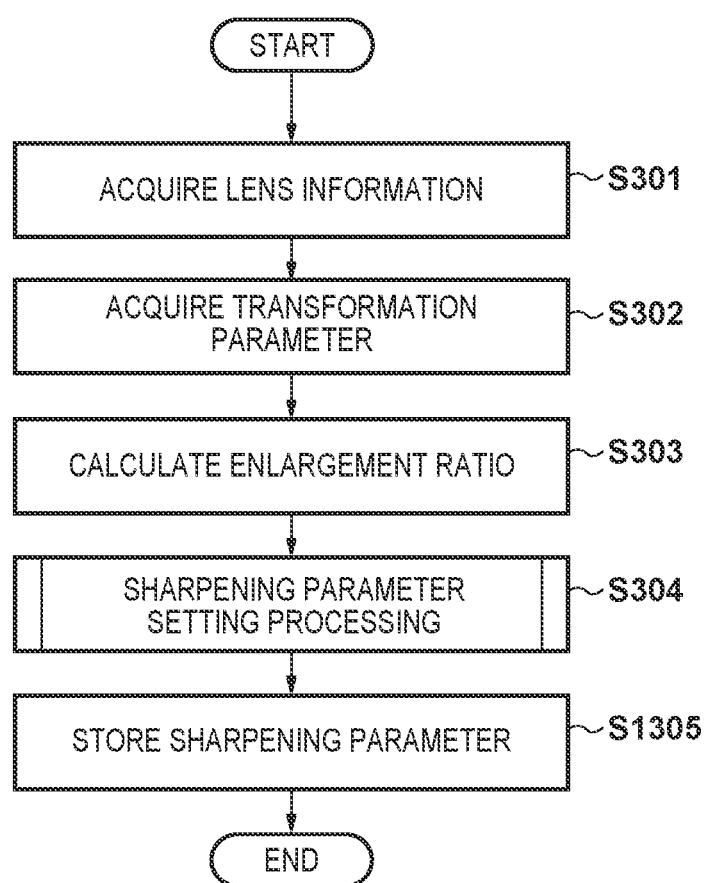
FIG. 13 is a flowchart of processing that the image processing apparatus performs.

First, processing for registering the sharpening parameter to the HDD 105 will be illustrated in accordance with a flowchart of FIG. 13. The flowchart illustrated in FIG. 13 is a flowchart in which step S305 has been replaced with step S1305 in steps S301 to S305 of FIG. 3.

In step S1305, the setting unit 204 registers in the HDD 105 the sharpening parameter for each pixel in association with the corresponding lens information and transformation parameter (lens information and transformation parameter used to obtain the sharpening parameter).

Figure 14:
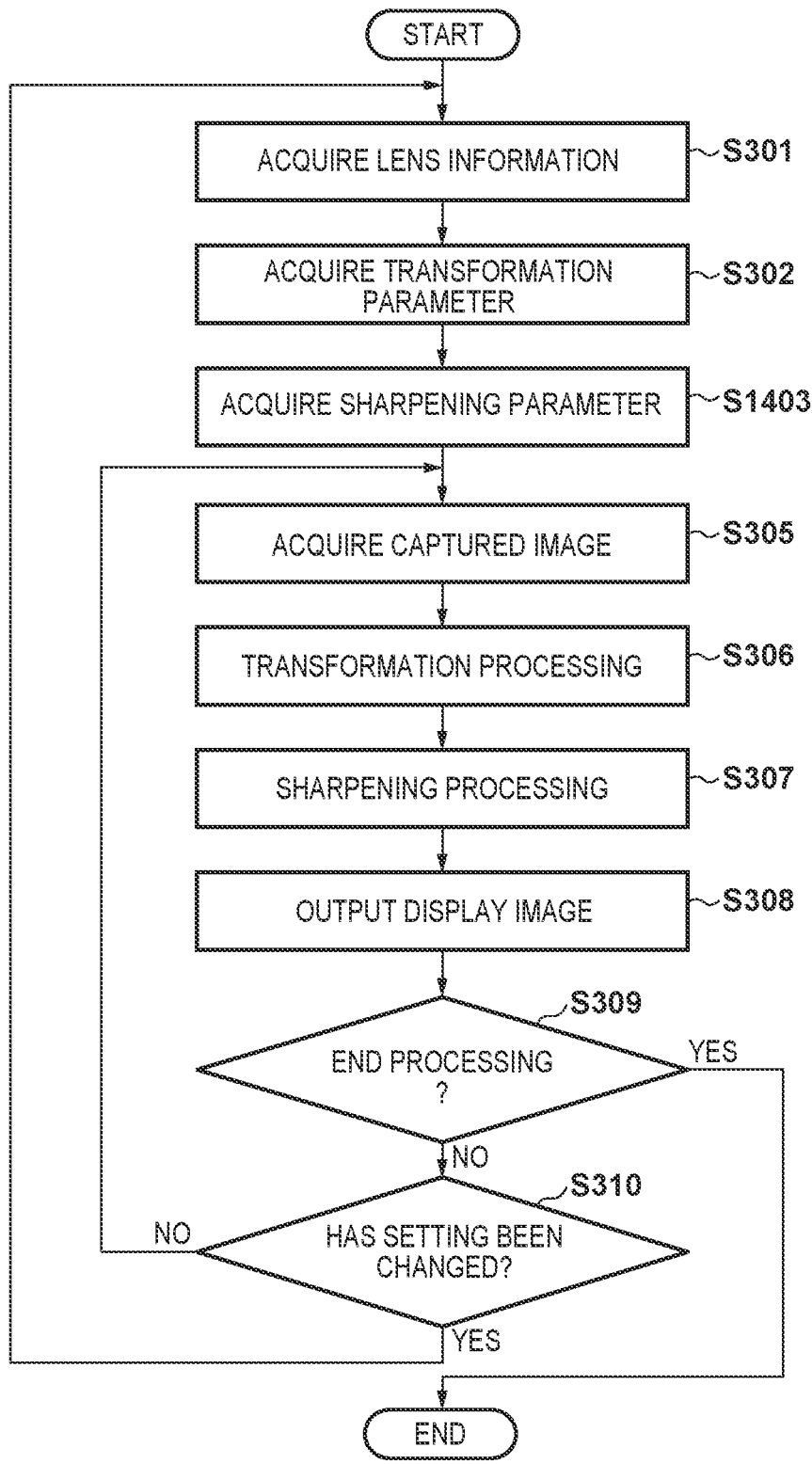
FIG. 14 is a flowchart of processing that the image processing apparatus performs.

Next, processing that the image processing apparatus performs in order to input the display image in the output device 109 after registration will be described in accordance with a flowchart of FIG. 14. The flowchart of FIG. 14 is the flowchart of FIG. 3 in which steps S303 and S304 have been replaced with step S1403.

In step S1403, the setting unit 204 acquires from the HDD 105 a sharpening parameter that corresponds to a combination of the lens information acquired in step S301 and the transformation parameter acquired in step S302.

Note that a sharpening parameter that meets the condition may be selected and acquired from a plurality of sharpening parameters generated in advance based on the transformation parameter and the lens information. In a case where there is no sharpening parameter that meets the condition, a sharpening parameter with the most similar condition may be selected. Also, in a case where there is no sharpening parameter with a similar condition, warning may be presented or the processing may be ended.

Also, the numerical values, processing timings, processing orders, types of memory for reading/writing data, and the like used in the above description have been given as examples in order to give a detailed description and there is no intent to limit to such examples.

In addition, some or all of the above described embodiments and modifications may be used in combination as appropriate. In addition, some or all of the above described embodiments and modifications may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123147, filed Jul. 17, 2020, which is hereby incorporated by reference herein in its entirety.

What is claimed is:

1. An image processing apparatus comprising:
a processor;
a memory including instructions stored thereon, which when executed by the processor cause the image processing apparatus to:
acquire a local enlargement ratio in an image transformed based on a transformation parameter;
acquire a transformed image which is a captured image transformed based on the transformation parameter;
acquire a sharpening parameter for sharpening the transformed image based on lens information, which indicates resolution of a lens used at a time of capturing the captured image, and the enlargement ratio;
perform sharpening of the transformed image based on the sharpening parameter; and
for each pixel in the transformed image: rotate, based on a polar angle that accords with a pixel position on a captured image that corresponds to this pixel, lens information that accords with an image height that corresponds to this pixel; convert, in accordance with an enlargement ratio that corresponds to this pixel, the rotated lens information; and acquire, as the sharpening parameter of this pixel, the converted lens information.

2. The image processing apparatus according to claim 1, wherein the instructions, when executed by the processor, further cause the image processing apparatus to: for each pixel in the transformed image, based on a pixel in the captured image that corresponds to a neighboring pixel of this pixel, obtain the enlargement ratio.

3. The image processing apparatus according to claim 2, wherein the enlargement ratio includes an enlargement ratio in a horizontal direction and an enlargement ratio in a vertical direction.

4. The image processing apparatus according to claim 1, wherein the instructions, when executed by the processor, further cause the image processing apparatus to: for each pixel in the transformed image: convert, in accordance with an enlargement ratio that corresponds to this pixel, lens information that accords with an image height that corresponds to this pixel; and acquire, as the sharpening parameter of this pixel, the converted lens information.

5. The image processing apparatus according to claim 1, wherein the instructions, when executed by the processor, further cause the image processing apparatus to output a sharpened transformed image to an apparatus that displays the transformed image.

6. An image processing apparatus comprising:
a processor;
a memory including instructions stored thereon, which when executed by the processor cause the image processing apparatus to:
acquire a local enlargement ratio in an image transformed based on a transformation parameter;
acquire a transformed image which is a captured image transformed based on the transformation parameter;
acquire a sharpening parameter for sharpening the transformed image based on lens information, which indicates resolution of a lens used at a time of capturing the captured image, and the enlargement ratio;
perform sharpening of the transformed image based on the sharpening parameter; and
for each region in the transformed image, acquire as a sharpening parameter of the region, lens information into which lens information that accords with an image height that corresponds to a representative pixel in the region was converted in accordance with an enlargement ratio that corresponds to the representative pixel.

7. An image processing apparatus comprising:
a processor;
a memory including instructions stored thereon, which when executed by the processor cause the image processing apparatus to:
acquire a local enlargement ratio in an image transformed based on a transformation parameter;

acquire a transformed image which is a captured image transformed based on the transformation parameter;

acquire a sharpening parameter for sharpening the transformed image based on lens information, which indicates resolution of a lens used at a time of capturing the captured image, and the enlargement ratio;

perform sharpening of the transformed image based on the sharpening parameter; and for each region in the transformed image, acquire as the sharpening parameter of the region, lens information which is obtained by rotating, based on a polar angle that accords with a pixel position on a captured image that corresponds to a representative pixel in the region, lens information that accords with an image height that corresponds to the representative pixel and then converting the rotated lens information in accordance with an enlargement ratio that corresponds to the representative pixel.

8. An image processing method performed by an image processing apparatus, the method comprising:

acquiring a local enlargement ratio in an image transformed based on a transformation parameter;

acquiring a transformed image which is a captured image transformed based on the transformation parameter;

acquiring a sharpening parameter for sharpening the transformed image based on lens information, which indicates resolution of a lens used at a time of capturing the captured image, and the enlargement ratio;

performing sharpening of the transformed image based on the sharpening parameter; and for each pixel in the transformed image: rotating, based on a polar angle that accords with a pixel position on a captured image that corresponds to this pixel, lens information that accords with an image height that corresponds to this pixel; converting, in accordance with an enlargement ratio that corresponds to this pixel, the rotated lens information; and acquiring, as the sharpening parameter of this pixel, the converted lens information.

9. A non-transitory computer-readable storage medium for storing a computer program for causing a computer to:

acquire a local enlargement ratio in an image transformed based on a transformation parameter;

acquire a transformed image which is a captured image transformed based on the transformation parameter;

acquire a sharpening parameter for sharpening the transformed image based on lens information, which indicates resolution of a lens used at a time of capturing the captured image, and the enlargement ratio;

perform sharpening of the transformed image based on the sharpening parameter; and for each pixel in the transformed image: rotate, based on a polar angle that accords with a pixel position on a captured image that corresponds to this pixel, lens information that accords with an image height that corresponds to this pixel; convert, in accordance with an enlargement ratio that corresponds to this pixel, the rotated lens information; and acquire, as the sharpening parameter of this pixel, the converted lens information.

10. An image processing method performed by an image processing apparatus, the method comprising:

acquiring a local enlargement ratio in an image transformed based on a transformation parameter;

acquiring a transformed image which is a captured image transformed based on the transformation parameter;

acquiring a sharpening parameter for sharpening the transformed image based on lens information, which indicates resolution of a lens used at a time of capturing the captured image, and the enlargement ratio;

performing sharpening of the transformed image based on the sharpening parameter; and for each region in the transformed image, acquiring as a sharpening parameter of the region, lens information into which lens information that accords with an image height that corresponds to a representative pixel in the region was converted in accordance with an enlargement ratio that corresponds to the representative pixel.

11. A non-transitory computer-readable storage medium for storing a computer program for causing a computer to:

acquire a local enlargement ratio in an image transformed based on a transformation parameter;

acquire a transformed image which is a captured image transformed based on the transformation parameter;

acquire a sharpening parameter for sharpening the transformed image based on lens information, which indicates resolution of a lens used at a time of capturing the captured image, and the enlargement ratio;

perform sharpening of the transformed image based on the sharpening parameter; and for each region in the transformed image, acquire as a sharpening parameter of the region, lens information into which lens information that accords with an image height that corresponds to a representative pixel in the region was converted in accordance with an enlargement ratio that corresponds to the representative pixel.

12. An image processing method performed by an image processing apparatus, the method comprising:

acquiring a local enlargement ratio in an image transformed based on a transformation parameter;

acquiring a transformed image which is a captured image transformed based on the transformation parameter;

acquiring a sharpening parameter for sharpening the transformed image based on lens information, which indicates resolution of a lens used at a time of capturing the captured image, and the enlargement ratio;

performing sharpening of the transformed image based on the sharpening parameter; and for each region in the transformed image, acquiring as the sharpening parameter of the region, lens information which is obtained by rotating, based on a polar angle that accords with a pixel position on a captured image that corresponds to a representative pixel in the region, lens information that accords with an image height that corresponds to the representative pixel and then converting the rotated lens information in accordance with an enlargement ratio that corresponds to the representative pixel.

13. A non-transitory computer-readable storage medium for storing a computer program for causing a computer to:

acquire a local enlargement ratio in an image transformed based on a transformation parameter;

acquire a transformed image which is a captured image transformed based on the transformation parameter;

acquire a sharpening parameter for sharpening the transformed image based on lens information, which indicates resolution of a lens used at a time of capturing the captured image, and the enlargement ratio;

perform sharpening of the transformed image based on the sharpening parameter; and for each region in the transformed image, acquire as the sharpening parameter of the region, lens information which is obtained by rotating, based on a polar angle that accords with a pixel position on a captured image that corresponds to a representative pixel in the region, lens information that accords with an image height that corresponds to the representative pixel and then converting the rotated lens information in accordance with an enlargement ratio that corresponds to the representative pixel.

* * * * *